United States Patent [19]

Rogov et al.

[11] 4,313,574

[45] Feb. 2, 1982

[54] APPARATUS FOR THE ACTIVATION OF CEMENT

[76] Inventors: Viktor F. Rogov, ulitsa Garibaldi, 30, korpus 2, kv. 70; Igor G. Nikiforov, ulitsa Obraztsova, 24, kv. 142; Ruben A. Tatevosian, ulitsa Gorkogo, 4, kv. 60; Mikhail Y. Titov, ulitsa Kominterna, 34/6, kv. 83, all of, Moscow; Nikolai K. Lipatov, ulitsa Mekhanizatorov, 1, kv. 4, Apatity Murmanskoi oblasti, all of U.S.S.R.

[21] Appl. No.: 100,125

[22] Filed: Dec. 4, 1979

[30] Foreign Application Priority Data

Dec. 7, 1978 [SU] U.S.S.R. ................................ 2688955

[51] Int. Cl.$^3$ ............................................ B02C 19/12
[52] U.S. Cl. .......................................... 241/78; 241/1; 241/152 A; 241/170; 241/184
[58] Field of Search ...................... 241/152 A, 153, 79, 241/79.3, 186 A, 170, 186 R, 1, 188 R, 78, 184

[56] References Cited

U.S. PATENT DOCUMENTS

| | | | |
|---|---|---|---|
| 706,197 | 8/1902 | Owen | 241/79 |
| 3,529,778 | 9/1970 | Willmann | 241/152 A |
| 3,987,967 | 10/1976 | Kuznetsov et al. | 241/1 |

*Primary Examiner*—Mark Rosenbaum
*Attorney, Agent, or Firm*—Fleit & Jacobson

[57] ABSTRACT

An apparatus for the activation of cement comprises at least one electromagnetic particle size reducer having a common reducer hopper at the inlet ensuring a gravity feeding of cement to the reducer, and a series sequence including a receiving hopper having a crusher and a conveying screw in a casing having a classifier in the form of a screen arranged at the outlet of the screw and communicating with the reducer hopper having an inclined bottom wall, the screen of the classifier comprising a body of revolution which is rigidly secured to the shaft of the screw coaxially with the shaft and arranged together with a portion of the screw and casing inside the reducer hopper upstream the inlet of the electromagnetic reducer.

9 Claims, 8 Drawing Figures

APPARATUS FOR THE ACTIVATION OF CEMENT

FIELD OF THE ART

The invention relates to the equipment for mechanical and physical activation of cement or a mixture of other binder with an aggregate and may be used at the construction and drilling sites, at long-term storage facilities and other places where cement or like binder materials are stored and used.

BACKGROUND OF THE INVENTION

Climatic features of Siberia and Polar North regions make it necessary to store the supplies of raw materials at working sites designed for a year. Long-term storage, even under favourable conditions, results in consolidation of cement and loss of its activity. Cement properties are materially impaired upon a long-term storage under unfavourable conditions, and especially during the autumn and winter period: cement is partly hydrated, lumped, setting time of cement mortar becomes longer, viscosity increases, cement stone strength properties are deteriorated and cement becomes unsuitable for grouting of wells.

Many types of equipment are now developed for the improvement of activity of binder materials prior to their use, which are based on mechanical activation using various mills, hydrycyclones, turbines, as well as vibratory, electromagnetic, ultrasonic and the like arrangements.

Known in the art is an apparatus for the activation of cement (cf. U.S. Pat. No. 3,987,967, Cl. 241-1), comprising at least one electromagnetic particle size reducer with a common reducer hopper at the inlet ensuring a gravity feeding of cement to the reducer.

The apparatus also comprises a series sequence including a receiving hopper with a crusher, a conveying screw in a casing, a classifier at the end of the screw comprising a flat screen with a frame arranged in a casing, an accumulating hopper having its inlet communicating with the classifier casing and the outlet communicating with the reducer hopper.

The screw and classifier of the apparatus have individual drives and a common control device so as to ensure a continuous flow of cement from the receiving hopper to the outlet of the electromagnetic reducer.

The electromagnetic reducer of the apparatus has a working chamber made of a non-magnetic material which is closed by a screen at the outlet for retaining working bodies made of magnetized magnetically hard pellets, such as barium hexaferrite pellets.

The working chamber of the reducer is surrounded by an electromagnetic coil supplied from an alternating current supply mains, and under the action of electromagnetic field of the oil the magnetized working bodies move chaotically to comminute, abrade and stir cement particles.

Combination of mechanical and magnetic actions in the prior art apparatus contribute to more complete restoration of active properties of cement.

The apparatus is designed for operation under stationary conditions in a production workshop manufacturing either cement or finished concrete products since the provision of several individual drives, devices taking no part in the activation process and functioning as auxiliary conveying means, as well as passive intermediate arrangements make the design complicated and cumbersome and do not enable the mobility of the apparatus for operation at construction and drilling sites where cement is directly used.

Moreover, in order to ensure continuous and uniform transportation of cement along all ducts of the apparatus, a device for an additional mechanical action on all passive intermediate arrangements—hoppers—is required, which also complicates the apparatus.

Known apparatus for the activation of cement is complicated in operation since it requires a continuous control for matching the output of various arrangements. Thus, when the starting cement physico-mechanical properties change, there is a mismatch in the operation of the receiving hopper, crusher and classifier arranged at the outlet of the screw. In particular, in case the moisture content of the starting cement increases, the output of the crusher also increases, and the output of the classifier decreases.

And finally, the prior art apparatus lacks uniformity of cement flow through the electromagnetic reducer which is due to the absence of an automatic cement level control at the inlet hopper of the electromagnetic reducer.

This lack of uniformity of cement flow through the working chamber effects the degree of activation of cement in the electromagnetic reducer and lowers the durability of the reducer and in certain instances results in an interruption of the reducer operation.

SUMMARY OF THE INVENTION

It is an object of the invention to provide a mobile apparatus for the activation of cement which enables its transportation for operation at places where cement is directly used at construction and drilling sites.

Another object of the invention is to provide an apparatus of a simplified design by minimizing the number of auxiliary and intermediate arrangements.

Further object of the invention is to provide an apparatus ensuring uniform and continuous transportation of cement along all ducts.

Still another object of the invention is to simplify operation of the apparatus under changing physico-mechanical properties of starting cement.

And finally an object of the invention is to ensure uniform flow of cement through the working chamber of an electromagnetic particle size reducer.

This is accomplished by that in an apparatus for the activation of cement, comprising at least one electromagnetic particle size reducer hereinafter referred to as reducer having a common reducer hopper at the inlet for a gravity feeding of cement to the reducer, and a series sequence including a receiving hopper with a crusher and a conveying screw in a casing having a classifier in the form of a screen arranged at the outlet of the screw and communicating with the reducer hopper which comprises an inclined bottom wall, according to the invention, the screen of the classifier comprises a body of revolution which is rigidly fixed to the shaft of the conveying screw coaxially with the shaft and arranged together with a portion of the screw and casing inside the reducer hopper upstream the inlet of the electromagnetic reducer.

The screw and casing preferably extend in the inner space of the reducer hopper through an opening of the inclined bottom thereof which is provided upstream the inlet opening of the receiving hopper, and the apparatus is preferably provided with a pipe establishing communication between the inner spaces of the hoppers, the pipe extending in the reducer hopper upstream the opening through which extend the screw and casing.

The pipe is preferably vertically adjustable to change the vertical position thereof over the inclined bottom of the reducer hopper.

The structure of the apparatus according to the invention is made much simpler owing to the minimization of the number of auxiliary and intermediate arrangements so as to improve mobility and simplify operation as well as to ensure uniform and continuous transportation of cement along all ducts of the apparatus and, in particular, through the working chamber of the electromagnetic reducer.

BRIEF DESCRIPTION OF THE DRAWINGS

The invention will now be described with reference to the accompanying drawings illustrating specific embodiments of the invention, in which.

DETAILED DESCRIPTION OF THE INVENTION

Figure 1:
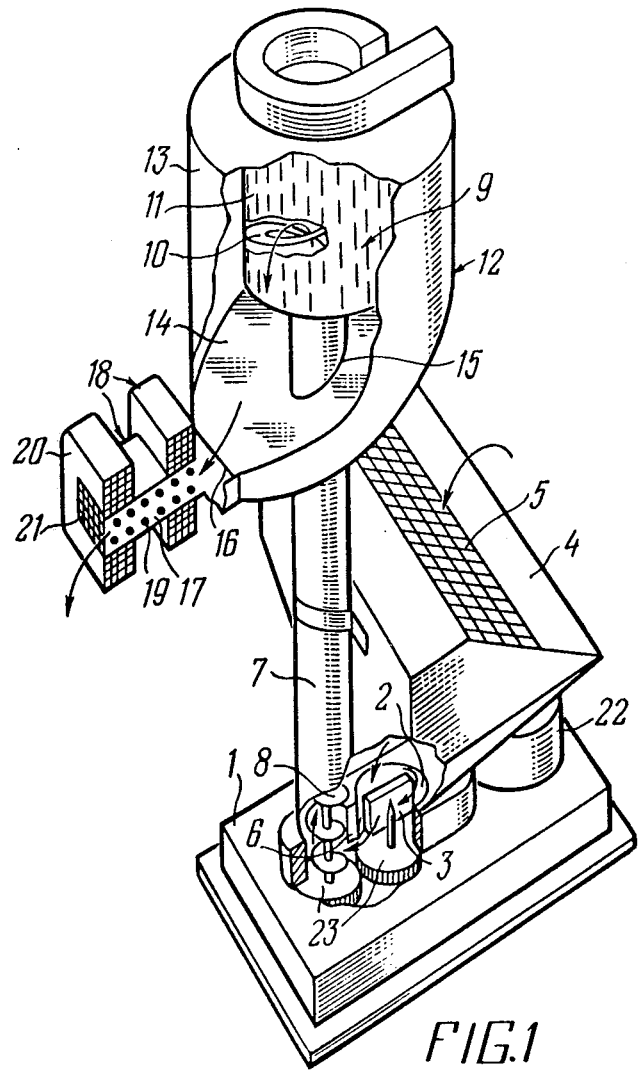
FIG. 1 is a perspective view of an apparatus for the activation of cement according to the invention, with a crusher and a reducer hopper shown partially in section and with an electromagnetic reducer also shown in section.

An apparatus for the activation of cement is mounted on a base 1 (FIG. 1) accommodating a crushing chamber 2 provided with a crusher 3 which is arranged in the bottom portion of a receiving hopper 4 having a retaining screen 5. The crushing chamber 2 communicates through a passage 6 with the inner space of a casing 7 of a conveying screw 8. The casing 7 of the screw 8 comprises a pipe.

A classifier 9 arranged at the outlet of the screw 8 comprises a fixed screw 10 and a screen 11 made in the form of a body of revolution. The drawing shows a cylindrical screen 11. The screen 11 is rigidly fixed to the shaft of the conveying screw 8 coaxially with the shaft.

The screen 11, together with a portion of the screw 8 and casing 7, is arranged inside a reducer hopper 12. The hopper 12 has vertical walls 13 and an inclined bottom wall 14. An opening 15 of the inclined wall 14 through which the screw 8 and casing 7 extend in the inner space of the hopper 12 is sealed.

An opening 16 is provided in the bottom portion of the hopper 12, through which the inner space of the hopper 12 communicates with a working chamber 17 of a single electromagnetic reducer 18.

The opening 15 through which the screw 8 and casing 7 extend is made in the inclined bottom wall 14 upstream the inlet of the working chamber 17 of the reducer 18 (upstream the opening 16), and working bodies 19 in the form of magnetized pellets of a magnetically hard material, such as barium hexaferrite are placed in the working chamber 17.

The working chamber 17 of the reducer 18 is surrounded by electromagnetic coils 20 and is closed at the outlet by means of a screen 21 to retain the working bodies 19 within the chamber 17.

The electromagnetic coils 20 are supplied from an alternating current supply mains.

The crusher 3, the conveying screw 8 and the classifier 9 have a common drive 22 which is coupled to these devices by means of a mechanical transmission 23.

Figure 2:
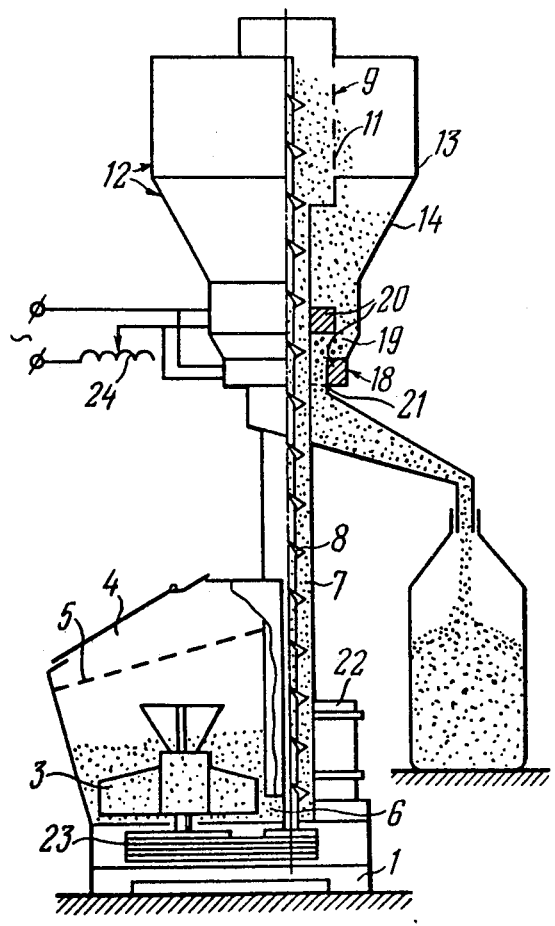
FIG. 2 shows a longitudinal section of an apparatus for the activation of cement according to the invention with another arrangement of an electromagnetic reducer relative to the reducer hopper.

It is shown in FIG. 2 that with a particular shape of the reducer hopper 12, the reducer 18 is arranged coaxially with the casing 7 of the screw 8, and the coils 20 of the reducer surround the screw 8 and casing 7 and are supplied from an alternating current supply mains through a voltage controller 24.

Figure 3:
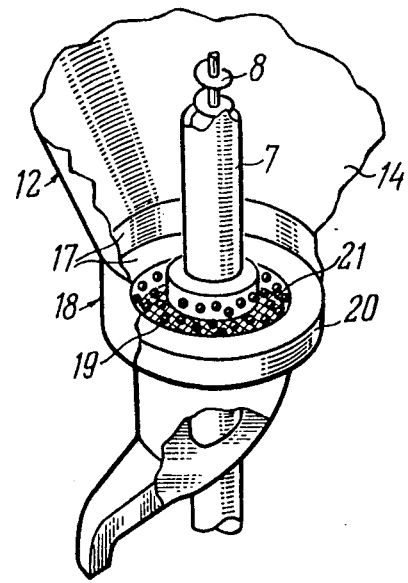
FIG. 3 is a perspective view, partially in section, of an embodiment of a reducer hopper and its arrangement relative to a reducer, according to the invention.

The relative arrangement of the bottom wall 14 of the hopper 12, chamber 17 and coils 20 of the reducer 18 is shown in greater detail in FIG. 3. Here the reducer hopper 12 is conical in the bottom portion.

Figure 4:
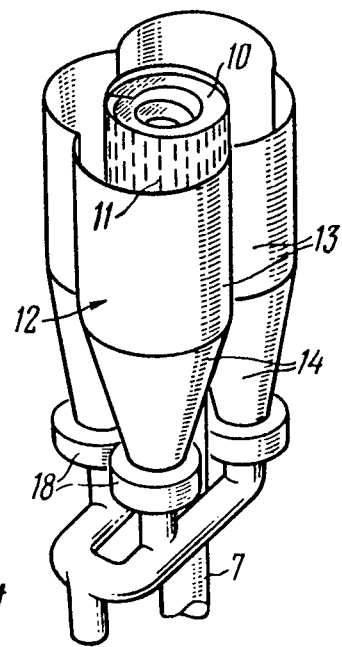
FIG. 4 is a perspective view of an embodiment of a reducer hopper and the arrangement of reducers in case several reducers are used, according to the invention.

The bottom wall 14 of the hopper 12 may comprise several, e.g. four cones as shown in FIG. 4 combined by the wall 13 which comprises four interconnected half-cylinders.

This shape of the bottom wall 14 of the hopper 12 ensures the provision of several (four) reducers 18 at the outlet thereof having their outlets interconnected by means of a common manifold.

The conical portions of the bottom wall 14 of the hopper 12 are arranged symmetrically relative to one another and with respect to the longitudinal axis of the screw 8.

Figure 5:
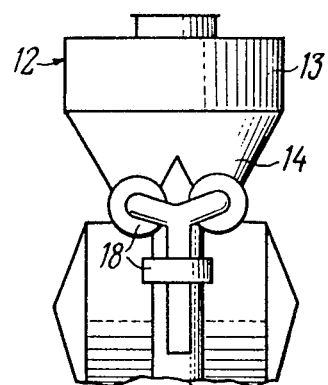
FIG. 5 is a front elevation view of still another embodiment of a reducer hopper and relative arrangement of a conveying screw in a casing, electromagnetic reducers and their hopper, according to the invention.
Figure 6:
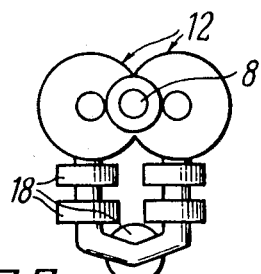
FIG. 6 shows a plan view of the embodiment shown in FIG. 5.

The provision of the bottom wall 14 of the hopper 12 in the form of two cones also arranged symmetrically relative to one another and with respect to the longitudinal axis of the screw 8 is shown in FIGS. 5 and 6.

This embodiment enables a horizontal and vertical combination arrangement of the reducers 18 at individual outlet pipes with a common manifold.

Figure 7:
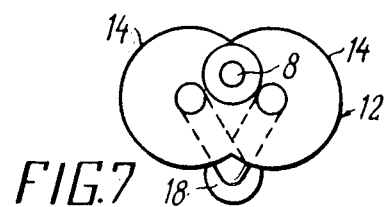
FIG. 7 is a plan view illustrating another relative arrangement of a conveying screw in a casing, electromagnetic reducer and reducer hopper, according to the invention.

Two cones of the bottom wall 14 of the hopper 12 may also be arranged asymmetrically with respect to the longitudinal axis of the screw 8 as shown in FIG. 7.

Figure 8:
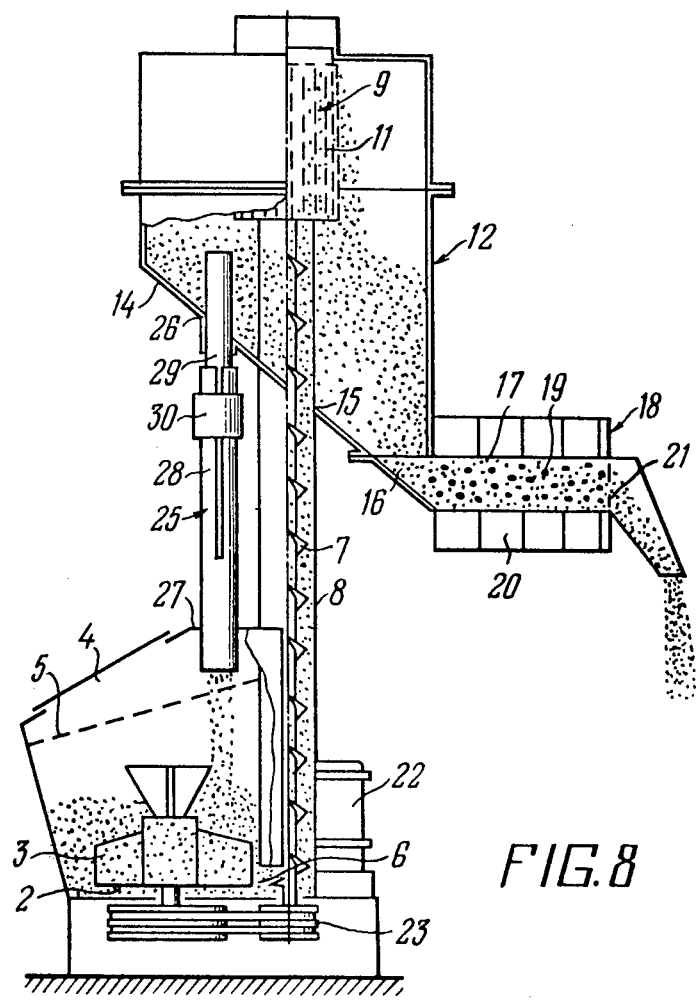
FIG. 8 shows a longitudinal section of an apparatus for the activation of cement according to the invention having a pipe.

The apparatus for the activation of cement shown in FIG. 8 is provided by a pipe 25 establishing communication between the inner spaces of the receiving hopper 4 and the reducer hopper 12.

One end of the pipe 25 extends in the inner space of the reducer hopper 12 through an opening 26 provided upstream the opening 15 through which extend the screw 8 and casing 7 and upstream the inlet opening of the receiving hopper 4, and the other end of the pipe extends through a cover plate 27 of the receiving hopper 4.

As shown in the drawing, the pipe 25 may be vertically adjustable for changing its vertical position over the inclined bottom wall 14 of the reducer hopper 12.

This is ensured owing to a telescopic design of the pipe 25 consisting of a fixed lower pipe 28, a movable upper pipe 29 and a locking collar 30.

The apparatus for the activation of cement functions in the following manner.

Cement to be activated is loaded in the hopper 4 (FIG. 1) in lumps not exceeding in their size the mesh size of the screen 5 of the hopper 4. The lumps of cement passing through the screen 5 get to the crushing chamber 2 in the zone of action of the crusher 3.

After the crushing cement is admitted to the passage 6 and to the casing 7 of the conveying screw 8 which feeds the material upwards to the classifier 9 with concurrent abrading and comminution.

Cement particles which do not exceed in size the mesh size of the cylindrical screen 11 pass therethrough and get to the reducer hopper 12 which ensures a gravity feeding of cement along the inclined bottom wall 14 of the hopper 12 through opening 16 to the working chamber 17 of the electromagnetic reducer 18.

After the treatment by the working bodies 19 activated cement is delivered outside the apparatus through the screen 21.

All rotary mechanisms—crusher 3, conveying screw 8 and screen 11 of the classifier 9—are driven by the drive 22 through the mechanical transmission 23.

The reducer 18 functions under the electromagnetic action of the coils 20 (FIG. 2) supplied from alternating current mains through the voltage controller 24 so that quality of cement treatment may be controlled.

The conveying screw 8 and the mechanical transmission 23 transmit vibrations to the walls of the hoppers 4 and 12 thus considerably facilitating the passage of cement through these arrangements so that additional vibrators may be dispensed with.

Maintenance of a constant layer of cement in the hopper 12 in front of the opening 16 positively affects quality of cement activation and continuity of operation of the apparatus.

Since the output of the crusher 3, conveying screw 8 and classifier 11 (FIG. 1) substantially exceed the output of the electromagnetic reducer 18, cement can accumulate and consolidate in the hopper 12 thus causing an interruption in operation of the apparatus due to an interruption of the material supply to the working chamber 17 of the electromagnetic reducer.

The provision of the pipe 25 (FIG. 8) establishing communication between the hoppers 4 and 12 determines the thickness of cement layer above the opening 16 by the height of the upper end of the pipe 25 over the inclined bottom wall 14 of the hopper 12.

Telescopic design of the pipe 25 makes it possible to adjust the thickness of the cement layer above the opening 16.

In case it is necessary to obtain a mixture of pulverulent materials concurrently with the activation, several receiving hoppers 4 may be provided communicating with the common conveying screw 8 through passages 6.

Components of a mixture meet at the lower turn of the screw 8 and are mixed. The mixing continues also during the lifting of materials along the screw 8 in the casing 7 and in the classifier 9, and electromagnetic reducer 18.

The apparatus according to the invention is most preferably used for the activation of consolidated cement which lost a number of physico-mechanical properties.

What is claimed is:

1. An apparatus for the activation of cement, comprising:
    a receiving hopper having a crusher;
    a conveying screw in a casing provided downstream said receiving hopper;
    a classifier comprising a screen arranged at the outlet of said conveying screw;
    at least one electromagnetic particle size reducer;
    a reducer hopper for said reducer provided at the inlet of said electromagnetic reducer for a gravity feeding of cement to the latter, said reducer hopper having an inclined bottom wall and communicating with the classifier;
    said screen of the classifier comprising a body of revolution which is rigidly secured to the shaft of said conveying screw coaxially with the shaft, said screen extending, together with a part of said screw with the casing in said reducer hopper upstream the inlet of said electromagnetic reducer.

2. An apparatus according to claim 1, wherein said hoppers have inner spaces and said apparatus comprising: said screw with the casing extending in the inner space of said reducer hopper through an opening of said inclined bottom wall thereof arranged upstream the inlet of said electromagnetic reducer;
    a pipe establishing communication between the inner spaces of said hoppers and extending in said reducer hopper upstream said opening through which extend said screw and casing.

3. An apparatus according to claim 2, wherein said pipe is vertically adjustable for changing its vertical position over said inclined bottom wall of said reducer hopper.

4. An apparatus according to claim 1, wherein said electromagnetic reducer has a hopper arranged coaxially with said casing of said conveying screw.

5. An apparatus according to claim 1, wherein said reducer hopper comprises a plurality of cones having inlets communicating with the classifier, said apparatus comprising an electromagnetic particle size reducer associated with each of said plurality of cones.

6. An apparatus according to claim 5, wherein said cones are symmetrically arranged around the axis of said casing.

7. An apparatus according to claim 5 or 6, wherein said size reducers have outlets interconnected by a common manifold.

8. An apparatus according to claim 6, wherein said particle size reducers have hoppers with axes extending horizontally.

9. An apparatus according to claim 5, wherein said cones are asymmetrically arranged around the axis of said casing.

* * * * *

UNITED STATES PATENT AND TRADEMARK OFFICE
CERTIFICATE OF CORRECTION

PATENT NO. : 4,313,574
DATED : February 2, 1982
INVENTOR(S) : Viktor ROGOV et al It is certified that error appears in the above—identified patent and that said Letters Patent is hereby corrected as shown below:

On the title page, Item [30] add:

Aug. 14, 1979[SU]  U.S.S.R. ........................2808251

Signed and Sealed this

Thirteenth Day of July 1982

[SEAL]

Attest:

Attesting Officer

GERALD J. MOSSINGHOFF

Commissioner of Patents and Trademarks